(12) United States Patent
Kuntze-Fechner

(10) Patent No.: US 8,662,847 B2
(45) Date of Patent: Mar. 4, 2014

(54) ROTOR BLADE WITH CONTROL TUBE

(75) Inventor: Gerald Kuntze-Fechner, Waakirchen (DE)

(73) Assignee: Eurocopter Deutschland GmbH, Donawoerth (DE)

( * ) Notice: Subject to any disclaimer, the term of this patent is extended or adjusted under 35 U.S.C. 154(b) by 699 days.

(21) Appl. No.: 12/901,701

(22) Filed: Oct. 11, 2010

(65) Prior Publication Data

US 2012/0087797 A1    Apr. 12, 2012

(51) Int. Cl.
*B64C 27/33*    (2006.01)
(52) U.S. Cl.
USPC ..................................... 416/134 A
(58) Field of Classification Search
USPC ............ 416/134 A, 135, 138, 136, 134 R, 239
See application file for complete search history.

(56) References Cited

U.S. PATENT DOCUMENTS 4,299,538 A * 11/1981 Ferris et al. ............... 416/134 A
4,975,021 A * 12/1990 Wagner et al. ............. 416/134 A

FOREIGN PATENT DOCUMENTS

| DE | 69303152 T2 | 2/1997 |
| EP | 0351577 A2 | 1/1990 |
| EP | 0296014 A1 | 12/1998 |
| EP | 1070662 A1 | 1/2001 |
| EP | 2246258 B1 * | 8/2011 |
| GB | 2036677 A | 7/1980 |

OTHER PUBLICATIONS

Search Report and Written Opinion; Application No. EP 09 40 0019; dated Nov. 13, 2009.

* cited by examiner

*Primary Examiner* — Richard Edgar
(74) *Attorney, Agent, or Firm* — Brooks Kushman P.C.

(57) ABSTRACT

A system comprising a rotor blade (1), in particular of the tail rotor of a rotary wing aircraft, in a fiber-reinforced composite design, with a blade section (5) and with a coupling section (9) for attaching the rotor blade (1) to the hub of a drive device, and comprising a separate sleeve-shaped control tube (40) with an essentially hollow-cylindrical shaft (41), with an also essentially tubular tie section (56) to tie the control tube (40) to the rotor blade (1) by sliding it onto its coupling section (9), is improved in that the coupling section (9) of the rotor blade (1) and the tie section (56) of the control tube (40) comprise a cross-sectional shape for positive-locking interconnection of the rotor blade (1) and the control tube (40).

16 Claims, 5 Drawing Sheets

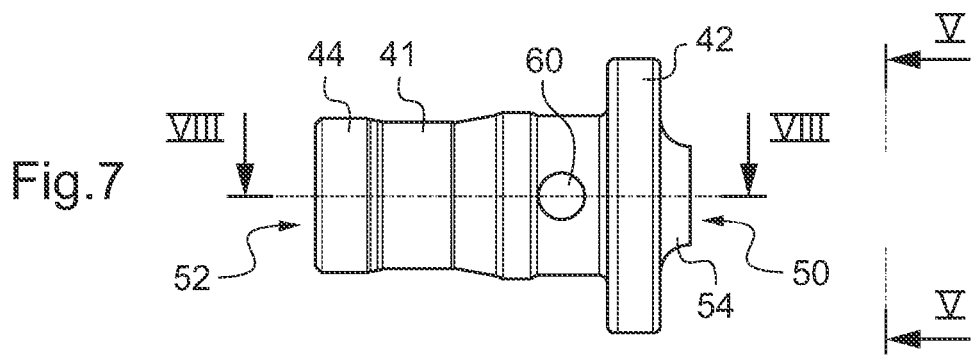
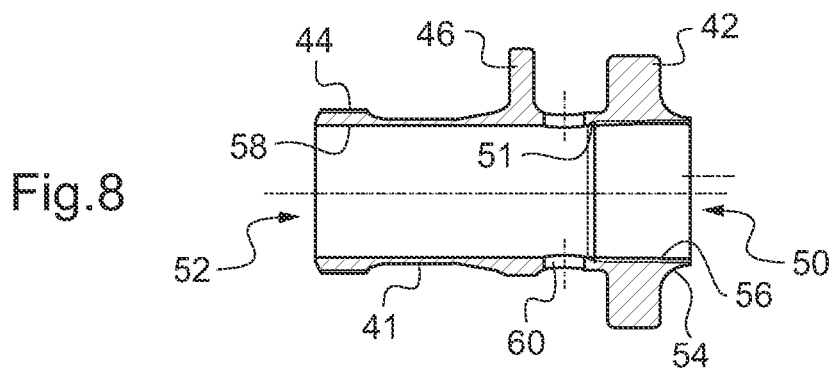
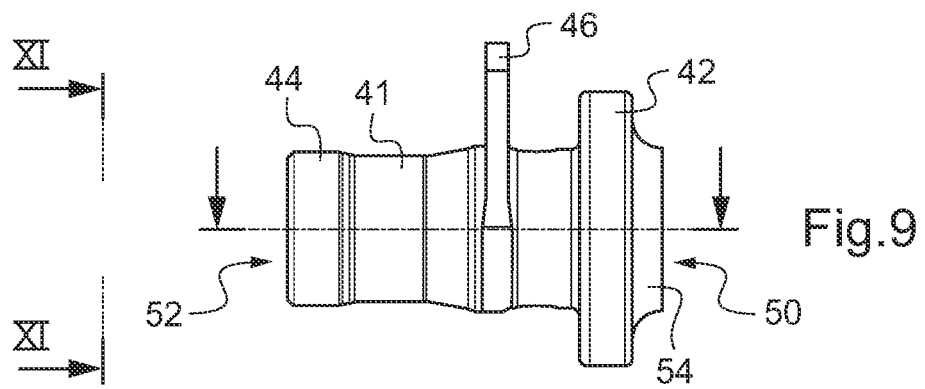
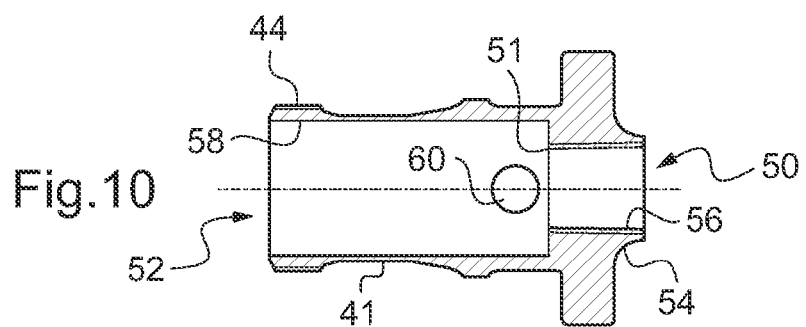

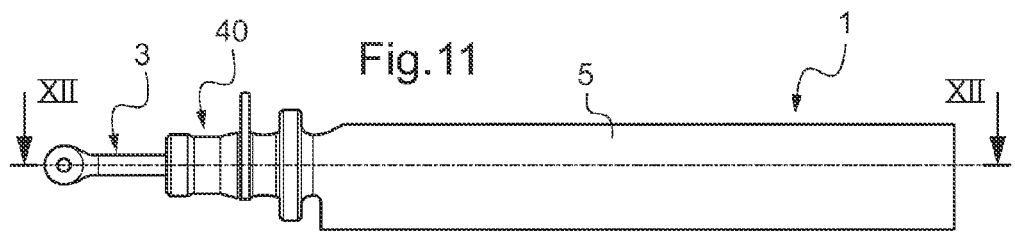
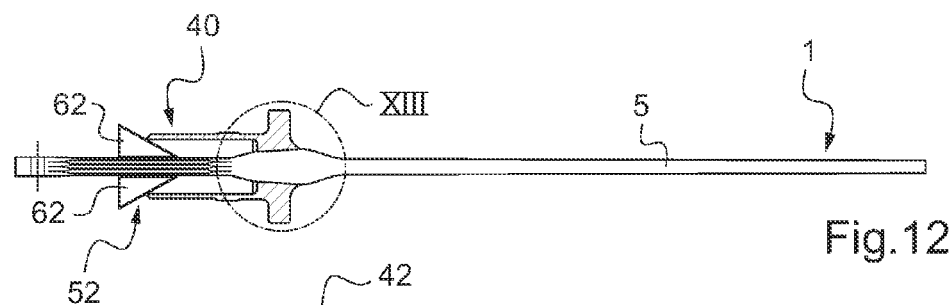
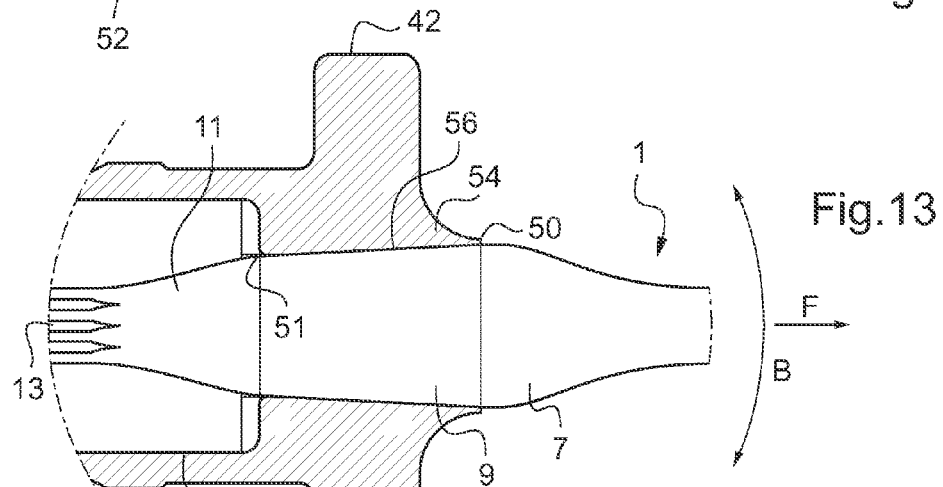
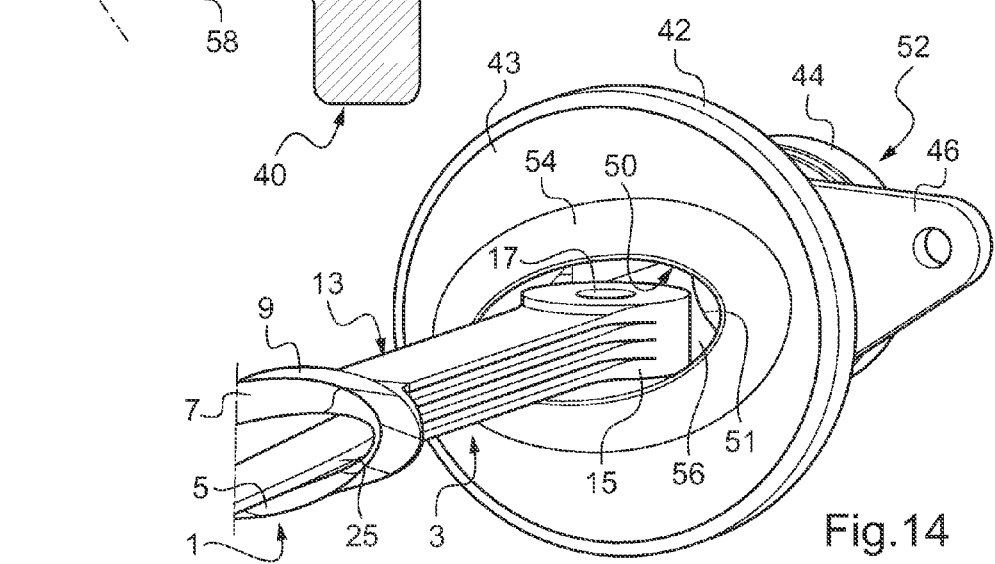

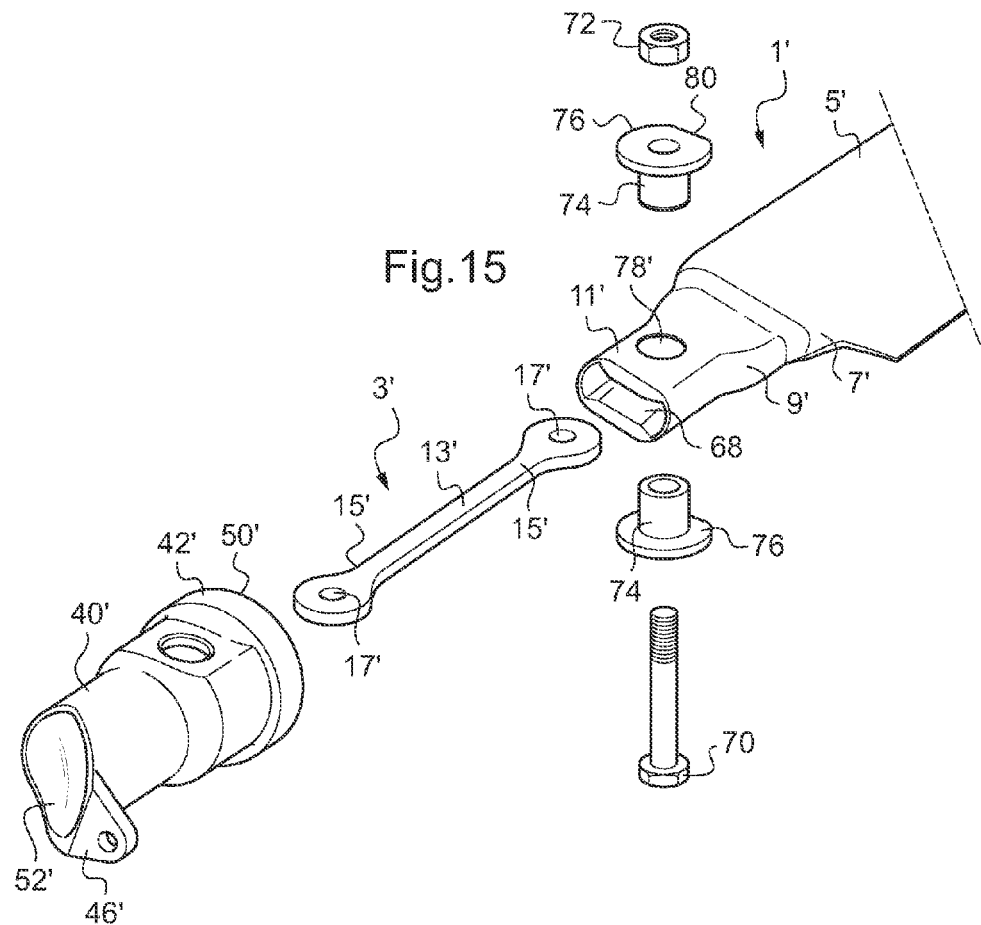
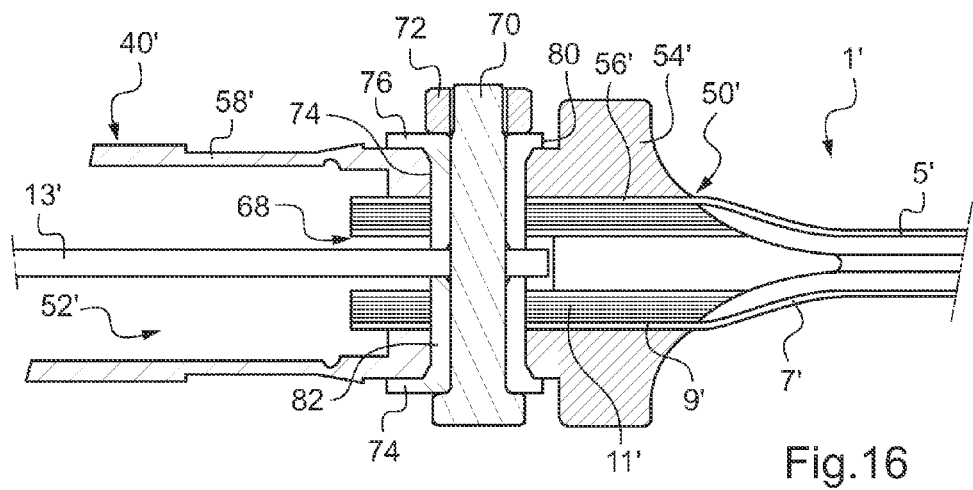

ROTOR BLADE WITH CONTROL TUBE

FIELD OF THE INVENTION

The invention relates to a system comprising a rotor blade which a fiber-reinforced composite design, and a separate sleeve-shaped control tube, in particular for a tail rotor of a rotary wing aircraft or helicopter.

BACKGROUND OF THE INVENTION

Rotor wings are known, for example, from DE 693 03 152 T2. It comprises a stiff composite shell with an aerodynamic profile that extends lengthwise in accordance with the span of the rotor blade, and a tubular blade base that extends the stiff shell on the side of the rotor blade that is connected to a hub. The blade base comprises two complementary half-shells that are formed by an extension of one of two layered jackets which together form the rigid composite shell. The half-shells can also be designed so as to be separate, in other words independent of the rigid shell, and can be pushed onto a small cone on the blade, which cone is circular in cross section. By rotation of the rotor blade relative to the two half-shells on its longitudinal axis, an angle of incidence can be pre-set in an infinitely variable manner. However, production of this rotor blade has been shown to be expensive, and its service life has been shown to be inadequate.

GB 036 677 A2 and EP 0 296 014 A1 disclose respectively a rotor blade in a fiber reinforced composite design with a blade section and a coupling section for attaching the rotor blade to the hub of a drive device. A sleeve shaped control tube is tied to the coupling section.

EP 1070662 A1 discloses a rotor blade with a flexing beam with integrated soft region for impact, folding motion and torsion. Damping elements are made between a soft-folding region of the flexing beam and the end of a transition region. They lie in the folding plane of the blade to the side of the flexing beam.

U.S. Pat. No. 4,975,021 A discloses a rotor, in particular a helicopter rotor, whereby the movement of the pitch angle of the rotor blade relative to a rotor hub is provided either by a blade neck with torsional flexibility disposed between a blade root and a blade wing or by a blade connection on a rotor hub arm with torsional flexibility. The pitch angle control for the blade is provided by a steering rod coupled to a torsionally stiff blade control casing extending coaxially without making contact along the blade neck or the rotor hub arm up to the blade wing or to the blade root. The control casing is supported on the blade root or rotor hub by at least one brace, which brace, in the longitudinal direction of the blade, has a T-shape. The vertical section of the T-shape is coupled to the blade control casing and the T-base is coupled with torsional flexibility to the blade root or the rotor hub arm, whereby the connection to the base is limited to both of the extremities of the base. Thus, the brace provides both a supporting function for the blade control casing and acts as a torsion bearing that enables rotational movement of the blade control casing and thus change of the blade pitch angle.

SUMMARY OF THE INVENTION

The invention relates to a system comprising a rotor blade which a fiber-reinforced composite design, and a separate sleeve-shaped control tube, in particular for a tail rotor of a rotary wing aircraft or helicopter.

The rotor blade comprises a blade section and a coupling section. During operation the coupling section faces a drive device. By way of the coupling section the rotor blade can be attached to a hub of the drive device, at least indirectly by way of a tension-torque-transmission element. The control tube or control sleeve comprises an essentially hollow-cylindrical shaft for receiving a tension-torque-transmission element and an also hollow tie section to tie the control tube to the rotor blade by attaching it to its coupling section.

Generally, the rotor blade is connected to the hub of a drive device by means of a tension-torque-transmission element or torque-transmission element. It can be constructed in a single piece with the rotor blade or separately, and can then be attached in the region of the coupling section of the rotor blade. It is torsionally flexible and during operation transfers tension forces due to the centrifugal force load of the rotor blade to the hub. Generally speaking it is enveloped by the sleeve-shaped control tube. It is the function of the control tube to transmit control forces to the rotor blade in order to change its angle of incidence, and to hold the rotor blade in a bearing arrangement on the drive device in all directions except for the direction of centrifugal force. For a bearing arrangement in a fenestron pot, said rotor blade at its circumference comprises a bearing arrangement section on the drive side of a smaller diameter, and a bearing arrangement section on the blade side of a larger diameter.

It is an object of the invention to provide a system comprising a rotor blade and a control tube, which system is economical to produce and requires little maintenance while meeting the requirements of a long service life.

In one embodiment of the system, there is a rotor blade and a control tube. A coupling section of the rotor blade and a tie section of the control tube comprise a matching cross-sectional shape for positive-locking interconnection of the rotor blade with the control tube. This aspect of the invention thus moves away from a circular cross-sectional contour at the contact positions of a separate rotor blade and of the associated control tube. Instead, at least one embodiment of the invention pursues the principle of making possible the force transmission of the control forces for the rotor blade by means of positive-locking fit between the rotor blade and the control tube. In other words, the cross-sectional shape of the coupling section of the rotor blade and of the tie section of the control tube, which interact during force transmission, is thus designed to make it possible to transmit considerable moments of torsion on the longitudinal axis of the rotor blade between the two sections. Thus, the cross-sectional shapes of the interacting sections can essentially correspond or they can cooperate, having positive fit, on an adequate number of bearing points. Thus, for example, the coupling section of the rotor blade can have a square cross-sectional shape, the four corners of which can be engaged by a four-beam cross-shaped or star-shaped cross-sectional shape of the coupling section so as to transmit a moment on the centre of the square cross section. In other words, positive-locking force transmission does not require complete or linear contact of the control tube within the coupling section; point-like contact can be sufficient.

The connection having positive fit can relieve an additional other connection, for example a bolt connection, to the extent that the latter is still required. Said connection having positive fit can even be the only connection between the coupling section and the tie section. Because it is sufficiently capable it can even render some other connection superfluous. It then contributes to savings in weight and installation effort, which in turn reduce the costs of the system. As a result of physically separating the rotor blade from the control tube, both components can be produced more simply, economically and with less scope for error, which is also beneficial in the context of the service life of both components.

As separate components the rotor blade and the control tube furthermore provide greater freedom of design. In particular, the rotor blade can provide increased stability and can be simpler to produce because during its production in a fiber-reinforced composite design all the fibers of the blade can extend, optimally flat and without any great deflection, into the coupling section of the rotor blade. As a result of doing without deflection, for example by fanning or splitting the fiber layers open in order to form an integrated control sleeve, transverse tensile strain in the fiber layers can be excluded. Said strain can result in delamination and can thus have a negative effect on the stability and the service life of the rotor blade. Furthermore, the production process of the rotor blade is simplified, and consequently not only is the risk of production errors occurring reduced, but the reproducibility of the production process is also enhanced. For this reason, in any case, the rotor blade can be produced at high quality even in series production in a fiber-reinforced composite design.

The cross-sectional shapes of the coupling section on the one hand and of the tie section on the other hand thus match each other so that they make positive-locking force transmission possible. According to an advantageous embodiment of the invention, the cross-sectional shapes of the two sections essentially correspond, so that they can be inserted one into the other in a positive-locking manner. Consequently the two sections contact each other along their entire circumference. This results in force introduction that is distributed over the entire circumference of both sections and that helps prevent tension peaks on just a few individual discrete contact points between the two sections. For example, both sections can be of rectangular shape. This shape suggests itself because it most closely corresponds to the shape at the blade transition region at the transition to the rotor blade and facilitates easy threading of the blade into an opening of the control tube. Furthermore, by means of said rectangular shape, a fork-shaped receiving device for the tension-torque-transmission element can be advantageously produced.

According to a further advantageous embodiment of the invention, the cross-sectional shape both of the coupling section of the rotor blade and of the tie section of the control tube is ellipsoid. In contrast to a shape comprising corners, an ellipsoid shape results in more even distribution of force so that notch stress in the corners of a rectangular shape, in particular at a threading opening on the control tube, can be avoided. In this way the design life in particular of the control tube can be positively influenced. An ellipsoid shape furthermore makes it possible to achieve a soft transition, which is favourable from the point of view of fiber technology, from the blade section to the cone. An ellipsoid shape can be designed in particular on the coupling section with comparatively little effort and can integrate without any problem a fork-shaped receiving device for the tension-torque-transmission element.

The corresponding cross-sectional shapes of the coupling section on the one hand and of the tie section on the other hand can result in a quasi-linear contact between the two sections. The cross-sectional shape thus extends essentially in circumferential direction, while hardly extending in longitudinal direction of the rotor wing. It can represent a very short and space-saving design. However, since it only comprises a small area for force transmission, very considerable force concentration can occur in the contact region. Therefore, according to a further advantageous embodiment of the invention, the coupling section of the rotor blade and the tie section of the control tube are designed such that on the circumference not only a linear contact but also an area-shaped and jacket-shaped contact between the two sections results. Providing a bearing face or contact face between the two sections leads to load distribution during force transmission, which in turn results in reduced area loads acting on the bearing face. In this way in turn damaging tension peaks can be prevented, and in particular the control tube can be dimensioned so as to be smaller. This results in savings in materials, in reduced production costs and in a longer service life of the control tube.

According to a further advantageous embodiment of the invention, the rotor blade and the control tube are bonded together on the bearing face between the coupling section and the tie section. In particular, the low surface loads as a result of forming the bearing face makes this simple attachment method possible, which method reduces the installation expenditure of the connection of both sections, thus reducing production costs, in particular if there is no need for a more expensive bolt connection.

Bearing faces in the shape of the generated surface of a straight circular cylinder that forms the coupling section of the rotor blade are known. According to a further advantageous embodiment of the invention, the coupling section and the tie section, when viewed in longitudinal direction of the rotor blade and thus in the direction of centrifugal force, are designed so as to conically increase in size towards the rotor blade. The coupling section of the rotor blade thus assumes the shape of an external cone, onto which an internal cone can be slid or placed in the tie section of the control tube. If a connection, irrespective as to whether it is a bolt connection or a bonded connection, between the coupling section of the rotor blade and the tie section of the control tube, were to fail, the control tube would be pushed onto the rotor blade as a result of the effect of centrifugal force. The connection is thus designed so as to be redundant, because it still remains functional even if the connection, for example of the bonding agent, were to fail.

As a result of the arrangement of the two cones, their cone areas, which represent the bearing faces between the rotor blade and the control tube, no longer extend in the direction of centrifugal force but instead at an angle to it. Consequently the shearing forces, which act as a result of the centrifugal force, in the connecting joint between the external cone on the rotor blade and the internal cone in the control tube are reduced. The connecting means, for example the bonding agent, is thus relieved and its service life is thus extended. Instead, compressive forces in a direction perpendicular to the bearing faces are activated. The conical design both of the coupling section and of the tie section thus increases the pressing force acting on the bearing surfaces, as a result of which the connection, in particular a bonding agent, is relieved and its service life is extended.

During operation the rotor blade is not only subjected to loads resulting from centrifugal force, but also to substantial bending moments resulting from flapping of the blade section. In the fiber-reinforced composite design the rotor blade can advantageously comprise spar-like and unidirectional fiber layers that extend continuously from the blade tip through the blade section right through into the coupling region. The almost deflection-free flow of the fiber layers makes it possible to create a bending-resistant and tension-resistant structure that is required for transmission of the bending moments from the blade into its bearing region by way of the control tube. According to a further advantageous embodiment of the invention, stiff, preferably unidirectional, fiber layers can be scarf-joined in the coupling section of the rotor blade. This increases the bending resistance and tension resistance in the coupling section, relieves the connection, and thus positively influences its service life. By scarf-joining further fiber layers the bending resistance can additionally be significantly improved. The orientation of the fiber layers can preferably be tilted by approximately +/−45° up to +/−90° relative to the longitudinal axis of the rotor blade. They can also be designed so as to be multiaxial.

Apart from being designed to introduce control forces into the rotor blade, the control tube is also designed to hold the rotor blade in the fenestron pot and to transmit bending moments from the blade section to the fenestron pot. To this effect the forces have to be transmitted from the rotor blade to the control tube. According to a further advantageous embodiment of the invention, the tie section of the control tube therefore comprises a transition section on the blade side, which transition section is designed to continuously increase the stiffness of the control tube. The transition section is arranged on the opening for threading or inserting the rotor blade into the control tube, thus preventing a sudden increase of the bending moments between the blade and the control tube and thus buckling at the threading opening. The transition section causes a continuous introduction of the bending moments, thus preventing damage to the blade.

According to a further advantageous embodiment of the invention, the rotor blade and a tension-torque-transmission element that is arranged between said rotor blade and the hub of the drive device are designed in one piece. This construction results in particularly good utilisation of material because fiber layers to form the blade section can make a continuous transition to the tension-torque-transmission element, without any interruption or butt joints. Apart from providing simple and economical production that is not prone to errors, this results in a reduction in the weight and dimensions of the rotor wing. Because there is no need to provide a connection between the rotor blade and the tension-torque-transmission element, the installation of the rotor wing is also made easier. In addition, the separate design of the control tube results in a simplified option for inspecting the transition between the rotor blade and the tension-torque-transmission element.

Further design options relating to the tension-torque-transmission element on the rotor wing are provided in EP 09 400 016.3. That application describes rotor wing with integrated tension-torque-transmission element and method for its production. Its content is expressly incorporated by reference herein.

Depending on the concrete geometry of the profile region of the rotor blade, the rotor wing is given a so-called angle of incidence relative to its rotation plane in which said rotor wing rotates in operation. The angle of incidence is predetermined for aerodynamic reasons and can be up to 20°. In contrast to this, as a rule, the tension-torque-transmission element extends in the rotation plane. If it is designed so as to be separate, it generally speaking connects to a fork-shaped attachment device on the rotor blade, which attachment device comprises an opening perpendicular to the plane of extension of the tension-torque-transmission element to form a bolt connection. Thus, when viewed from the blade tip, at the latest in the region of attachment of the tension-torque-transmission element, angular compensation must take place on the rotor blade. To this effect in principle the fork together with the opening for the bolt connection can extend so as to be tilted by the angle of incidence relative to the rotor blade, without the fiber layers also being tilted in this manner. This results in fiber layers in the region of the fork, which fiber layers are cut at an oblique angle. As an alternative, a torque-transmission section can be arranged between the blade section and the fork, in which torque-transmission section the fiber layers from the blade section are twisted by the angle of incidence and lead into the fork-like attachment in the region of the coupling section. According to a further advantageous embodiment of the invention, the torque-transmission section is arranged in the coupling section of the rotor blade. With the integration of the torsional movement in the coupling section the rotor blade can be designed to be shorter, which results in savings in cost and weight. With its position in the coupling section and thus within the control tube the torque-transmission section is furthermore shifted from the region of the rotor blade, which region is subjected to airflow, to a region that is not subjected to airflow and is thus aerodynamically ineffective. This is advantageous because the torque-transmission section has a larger cross section across the main direction of extension of the rotor blade, which larger cross section would create aerodynamic resistance. It can thus be eliminated. If the rotor blade in the coupling section and the control tube in its tie section form bearing surfaces, then the tie section must also be twisted. However, integrating the torque-transmission section in the coupling section does not pose any difficulty from the point of view of production technology, in relation to the corresponding matching of the control tube.

BRIEF DESCRIPTION OF THE DRAWINGS

Below, several features of the invention are depicted in these figures:

FIG. 7 is a first lateral view;
FIG. 8 is a section view according to FIG. 7;
FIG. 9 is a second lateral view;
FIG. 10 is a section view according to FIG. 9;
FIG. 11 is a top view of a rotor wing with an installed control tube;
FIG. 12 is a section view according to FIG. 11;
FIG. 13 is a detailed section view according to FIG. 12;
FIG. 14 is a perspective view of a rotor wing and of a control tube during installation;
FIG. 15 is an alternative rotor wing with a separate tension-torque-transmission element and a control tube;
and
FIG. 16 is a section view of the alternative rotor wing.

DETAILED DESCRIPTION OF THE PREFERRED EMBODIMENTS

Figure 1:
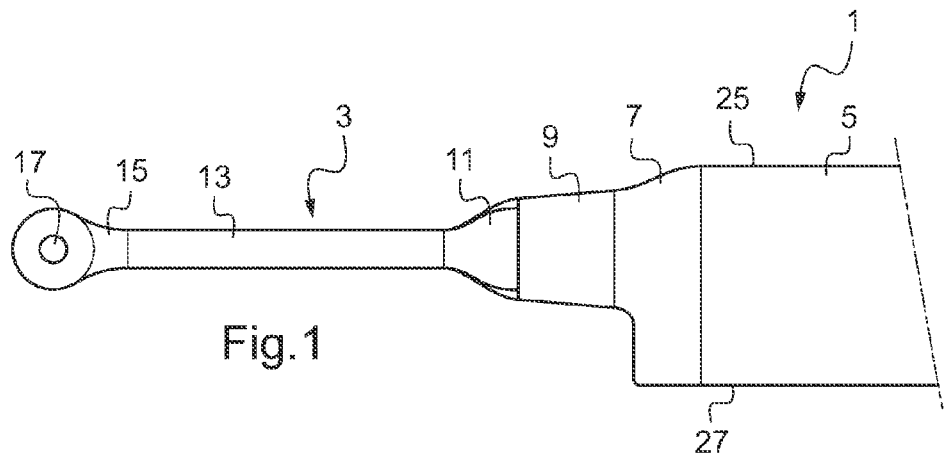
FIG. 1 is a top view of a rotor wing.

A rotor wing (only partially shown in FIG. 1) includes a rotor blade 1 and a tension-torque-transmission element 3. The tension-torque-transmission element 3 connects the rotor blade 1 to the hub of a drive device (not shown). The rotor blade 1 and the tension-torque-transmission element 3 are designed in a single piece, wherein from a blade section 5 of the rotor blade 1 on the hub side a blade transition section 7 follows on, which in turn is adjoined by a conical coupling section. It comprises a torque-transmission section 9 from which the tension-torque-transmission element 3 follows on with a blade-side connecting section 11, which in particular in top view makes a strongly conical transition to a significantly slimmer rectangular torque-transmission element 13. The latter expands to form a club-shaped connecting section 15 on the hub side, which connecting section 15 accommodates a circular connecting eye 17 that extends perpendicularly through said connecting section 15.

Figure 2:
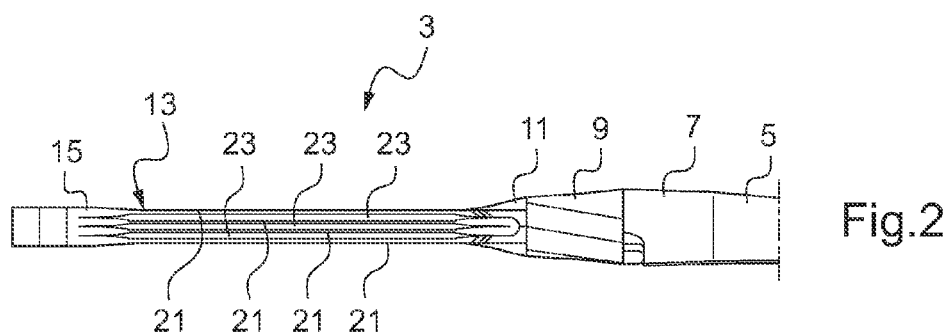
FIG. 2 is a lateral view of the rotor wing.

As shown in lateral view in FIG. 2, the torque-transmission element 13 comprises four individual tape-shaped lamellae 21 that extend parallel to each other and are stacked, which lamellae enclose slots 23 of the same nature. At almost the same design height the torque-transmission element 13 makes a transition to the connecting section 15 on the hub side. In contrast to this, on the opposite connecting section 11, which is arranged on the blade side, said torque-transmission element 13 widens so that the connecting section 11 on the blade side has a strongly conical shape also in the lateral view.

The blade section 5 comprises an aerodynamically effective profile in cross section. Said blade section 5 is essentially flat and elongated between its front 25 and its trailing edge 27. The connecting blade transition section 7 (compare also FIG. 3) serves to establish a transition between the elongated profile of the blade section 5 and the compact cross section of the connecting ellipsoid torque-transmission section 9. Since the torque-transmission section 9 is considerably more compact, a strong cross-sectional change takes place in the blade transition section 7.

Figure 3:
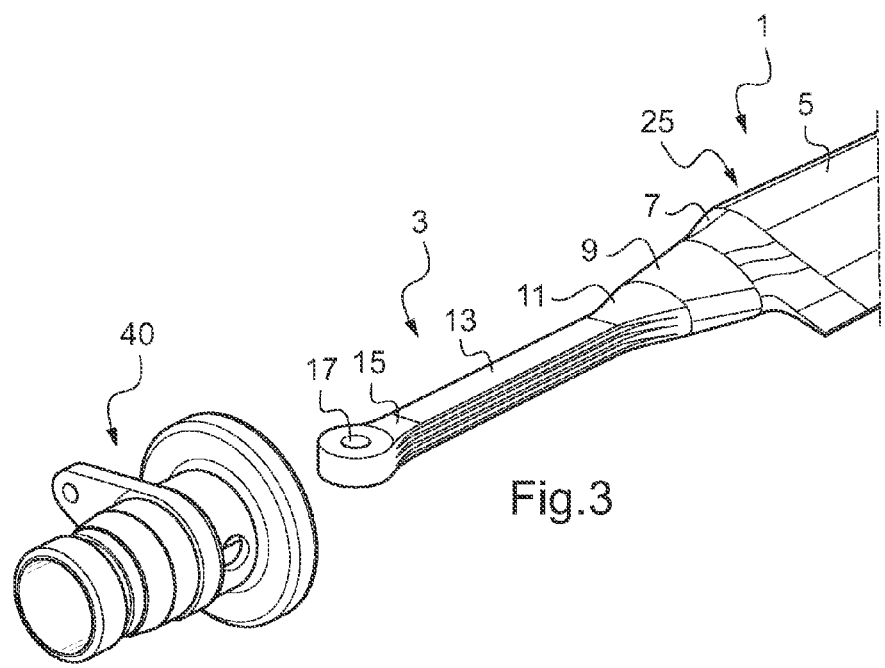
FIG. 3 is a perspective view of a rotor wing and of a control tube (not installed)
Figure 4:
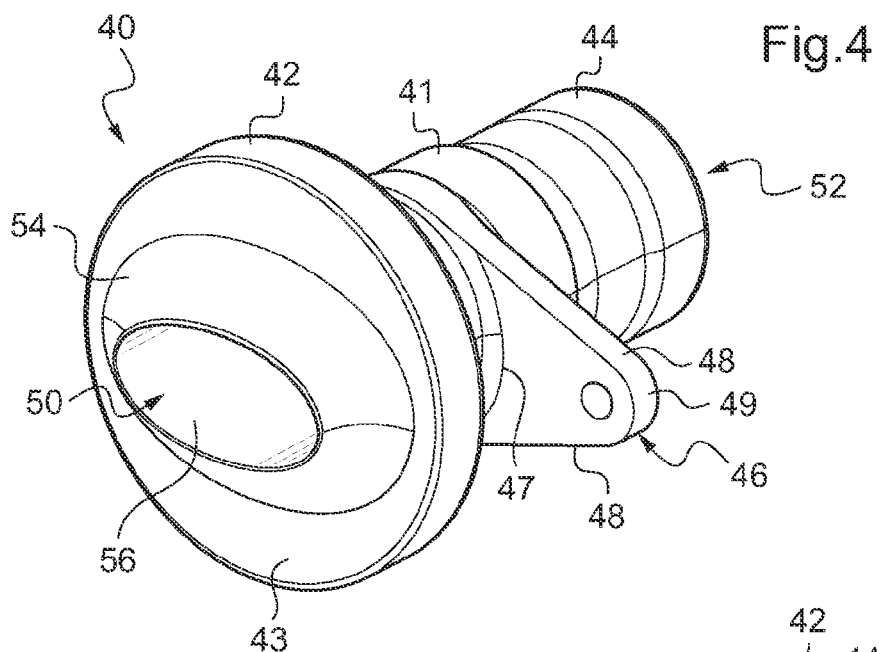
FIG. 4 is a perspective view of the control tube.

The rotor wing has a so-called angle of incidence of approximately 16° of its blade section 5 relative to its rotational plane in which the tension-torque-transmission element 3 extends. Said angle of incidence is also shown in FIGS. 3 and 14. The torque-transmission section 9 serves to match the resulting different extension planes of the blade section 5 on the one hand, and of the tension-torque-transmission element 3 on the other hand. Furthermore, it is used as a contact face for a control tube 40 (compare FIGS. 3 to 16) that is described in detail later.

In the connecting blade-side section 11, which is even more strongly conical in design than the torque-transmission section 9, the cross-sectional adaptation between the ellipsoid torque-transmission section 9 and the almost rectangular tension-torque-transmission element 3 takes place. Said section 11 forms the transition to the lamellae 21 that form the torque-transmission element 13 and that with an essentially rectangular cross section and their elongated tape-like shape lead to the connecting section 15 on the hub side.

The rotor wing according to the invention is produced in a fiber-reinforced composite design, wherein the individual fiber layers from which it is comprised partly extend from the connecting section 15 on the hub side through the tension-torque-transmission element 3 by way of the torque-transmission section 9, the blade transition section 7, through the blade section 5 and up to its blade tip (not shown). Due to the very different cross-sectional shapes, in particular of the blade section 5 and of the connection section 15 on the hub side, not all the fiber layers completely extend through the entire rotor wing. However, those fiber layers that form the lamellae 21 extend from the connecting section 15 on the hub side through the entire rotor wing up to the blade section 5 and the blade tip of said rotor wing. They quasi form a main structure of the rotor wing.

More design detail of the fiber layers of the rotor blade and of the tension-torque-transmission element appear in EP 09 400 016.3 that was referenced earlier.

FIG. 3 shows the rotor wing according to the invention according to FIGS. 1 and 2 in a perspective view together with a control tube 40 to be installed. The control tube 40 is shown in a reverse view in an enlarged and separate illustration in FIG. 4. It comprises a base body 41, which in principle is tubular, which on the side of the rotor blade comprises a disc-shaped bearing arrangement section 42 of a larger diameter, and on the side of the hub comprises a likewise disc-shaped bearing arrangement section 44 of smaller diameter. In between, a control lever 46 is radially distant from the base body 41. It comprises a triangular disc whose base 47 rests against the base body 41 and whose edges 48 extend tangentially from the base body 41 and meet in a rounded and perforated head part 49. On the blade side the control tube 40 comprises an ellipsoid threading opening 50 of an essentially hollow-cylindrical tie section 56 into which during installation the rotor wing 1 is pushed or inserted with the correspondingly torque-transmission section 9 (compare FIG. 14), with the tension-torque-transmission element 3 front-most. The threading opening 50 is distant, in a quasi-crater-shaped manner, from a lateral surface 43 of the bearing arrangement section 42 on the blade side. Said threading opening 50 forms the blade-side end of a rounded transition section 54 that comprises an ellipsoid cross section that diminishes in axial direction towards the rotor blade 1. Within the base body 41, at the threading opening 50, an internal cone 56 commences as a tie section (compare FIGS. 8 and 10).

Opposite the threading opening 50 there is a circular opening 52 from which in the operational state the tension-torque-transmission element 3 projects at least in part (compare FIG. 11).

Figure 5:
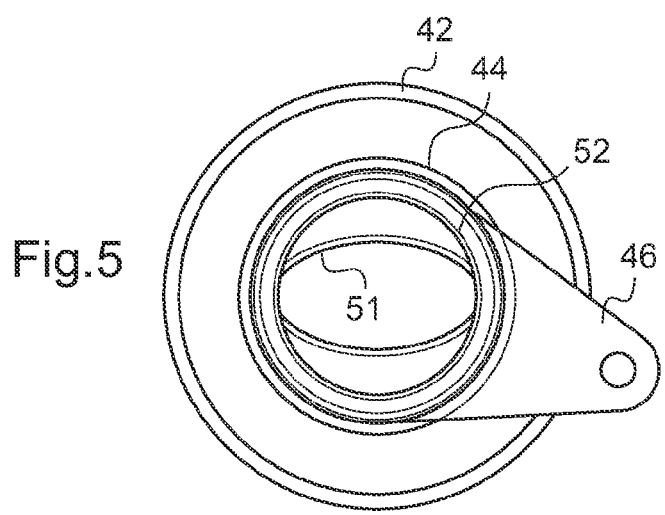
FIGS. 5, 6 are axial views of the control tube.

FIG. 5 shows an axial view of the control tube 40 from the hub side. Since the hub-side bearing arrangement section 44 of the control tube 40 has a smaller diameter than does the blade-side bearing arrangement section 42, it is not covered up by it, nor is the control lever 46 which projects radially further outward than does the bearing arrangement section 42 on the blade side. The circular opening 52 reveals an ellipsoid cone end 51 of the internal cone 56.

Figure 6:
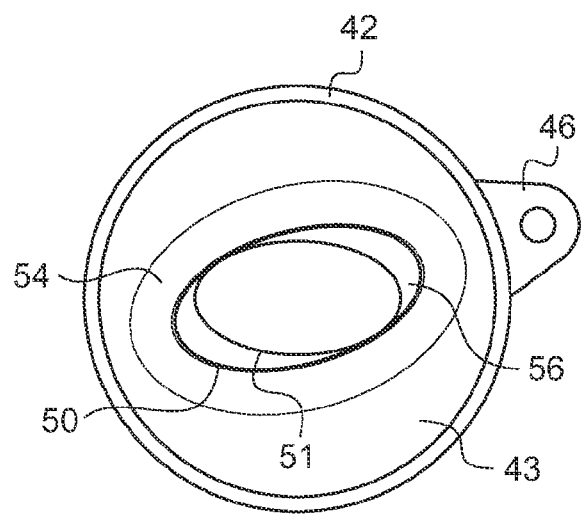

FIG. 6 provides an axial view of the control tube 40 in the opposite direction to that shown in FIG. 5, i.e. in the direction of threading the rotor blade 1. Due to its larger diameter, the bearing arrangement section 42 on the blade side covers the base body 41 situated further behind, as well as covering the bearing arrangement section 44 on the hub side. Only the control lever 46, which is arranged further behind, radially protrudes beyond the bearing arrangement section 42 on the blade side. On the lateral surface 43 of the bearing arrangement section 44, which lateral surface 43 faces the viewer, the transition section 54, which is ellipsoid in horizontal projection, protrudes towards the viewer, which transition section 54 leads into the threading opening 50. Said threading opening 50 reveals the internal cone 56 and its ellipsoid cone end 51 that is axially rotated relative to the threading opening 50.

As shown in the section views of FIGS. 8 and 10, the threading opening 50 is the start of an ellipsoid internal cone 56 that tapers off in axial direction, which at the cone end 51 ends in a smaller ellipse than that of the threading opening 50. This is adjoined by a regular internal cylinder 58 which penetrates the base body 41 from the cone end 51 to the opening 52. On the blade-side end of the internal cylinder 58 in its wall two opposing drainage holes 60 that extend radially are arranged. On the one hand they are positioned so that during operation any moisture that enters the control tube through the opening 52 can escape through the drainage holes 60. It cannot leave the internal cylinder 58 through the cone end 51 because in that position the rotor blade 1 with the control tube 40 has been inserted and bonded so as to provide a seal. On the other hand the drainage holes 60 are designed to be sufficiently large so that they can serve for inspection purposes in the inspection of the torque-transmission element 13 or the connecting section 11 on the blade side.

As shown in FIGS. 8 and 10 in conjunction with FIG. 6, the internal cone 56 not only comprises an ellipsoid shape with a taper, but is also slightly twisted. FIG. 6 shows the ellipsoid threading opening 50 and the cone end 51 described therein, which is rotated by 16° on the axis of the control tube 40 and which is also ellipsoid, of the tie section 56. Torsion by 16 degrees corresponds to the angle of incidence of the rotor blade 1 relative to the tension-torque-transmission element 3. As shown in the axial view according to FIG. 6, the cone end 51 is completely inscribed in the ellipse of the threading opening 50. For reasons associated with production, the main radii and the minor radii of the ellipsoid threading opening 50 and of the cone end 51 have been selected such that no undercut arises in the control tube 40. As a result of this dimensioning the control tube 40 remains without an undercut and can be made in one pass, for example by milling.

FIG. 11 shows a view of a rotor wing with a control tube 40 installed, while FIG. 12 shows a section view of an installation state. Accordingly, the control tube 40 completely covers both the torque-transmission section 9 and the connecting section 11 on the blade side, and covers approximately half of the torque-transmission element 13. In order to correctly centre the control tube 40 when it is installed on the rotor wing, during the bonding process mounting wedges 62 are inserted into the circular opening 52 opposite the threading opening 50, which mounting wedges are supported by the tension-torque-transmission element 3.

FIG. 13 shows the coupling section between the rotor wing and the control tube 40 in detail. Said coupling section coincides with the torque-transmission section 9. In the region of the bearing arrangement section 42 the internal cone 56 extends between the threading opening 50 and the cone end 51. After threading or inserting the rotor blade 1 into the control tube 40, the generated surface of the conical torque-transmission section 9 rests with its entire area in the internal cone 56 of the control tube 40. On this contact surface the two parts are bonded together. At that location a large part of the forces which during operation act on the rotor blade 1 are transmitted by way of the control tube 40 to a fenestron pot.

The detailed view of FIG. 13, instead of showing the blade section 5, shows the loads that act on it. Due to the intrinsic weight of the blade section 5, during rotation a centrifugal force F acts, which is directed away from the hub. Flapping of the blade section 5 perpendicularly to its plane of extension results in bending moments B. It is not so much the centrifugal force F, which is predominantly transmitted by way of the tension-torque-transmission element 3, that acts on the contact areas between the rotor blade 1 and the control tube 40, but above all the bending moments B. They are practically exclusively transmitted onward to the fenestron pot by way of the control tube 40.

Depending on the direction of flapping, pressure forces or tension forces occur on the contact surfaces in the bearing arrangement section 42. In particular the tensile forces represent a load that can negatively affect the service life of the bond. However, since the internal cone 56 increases in the direction of centrifugal force, and the centrifugal force acting on the rotor blade 1 is predominantly absorbed by the tension-torque-transmission element 3, the centrifugal force F presses the control tube 40 in its direction of influence towards the outside. Pressure is thus exerted on the contact surfaces of the rotor blade 1 at its connecting section 9. The action of the centrifugal force F on the control tube 40 thus relieves the bond in that it additionally causes contact forces that counteract the tensile forces that act on the bond at the contact surfaces. At the same time said contact forces ensure that a reliable positive-locking connection between the control tube 40 and the rotor blade 1 at its connecting section 9 is maintained.

The bending moments that act on the rotor blade 1 thus in pairs cause tension forces and pressure forces that are transmitted, by way of the bearing arrangement section 42 on the blade side and the bearing arrangement section 44 on the hub side (FIGS. 7 to 10), to the fenestron pot. Thus the tension-torque-transmission element 3 is relieved of transverse forces, at least those resulting from bending, so that it essentially has to be designed to withstand the centrifugal forces F of the rotor blade 1 and the torsion moments from control forces acting on the control tube 40, which forces and moments are to be expected in operation.

FIG. 14 shows the interaction in particular of the connecting section 9 on the rotor blade 1 with the control tube 40. The figure further shows the angle of incidence of the rotor blade 1 relative to the tension-torque-transmission element 3 indirectly by the main axis of the ellipsoid threading openings 50, which main axis is tilted relative to the plane of extension of the torque-transmission element 13.

The system according to the invention, which system comprises a rotor blade 1 and a control tube 40, is not limited to rotor wings with an integrated tension-torque-transmission element 3 or with a tension-torque-transmission element 3 that is formed in a single piece. FIGS. 15 and 16 show an example of a rotor blade 1' comprising a blade section 5', a blade transition section 7', a torque-transmission section 9' and a connecting section 11' to which a separate tension-torque-transmission element 3' is attached. To this effect the connecting section 11' forms a fork-shaped receiving pocket 68 into which the separate tension-torque-transmission element 3 can be inserted. Said tension-torque-transmission element 3' is symmetric, with a quasi-bone-shaped design, and comprises a torque-transmission element 13' and two connecting sections 15', each comprising a connecting eye 17'. In principle, said tension-torque-transmission element 3' can comprise individual metal lamellae, as is the case in conventional elements, or it can also be designed in a fiber-reinforced composite design, analogously to the tension-torque-transmission element 3 that has already been described above.

Related details appear in a corresponding European patent application—EP 09 400 017.1, which is incorporated herein by reference. It discloses a tension-torque-transmission element for a fenestron blade and method for producing it. Said tension-torque-transmission element 3' is screwed to the rotor blade 1' by way of a bolt 70 and a counter nut 72. To this effect its connecting section 11' comprises a connecting hole 78 into which bushes 74 with a flange 76 that is flattened on one side are inserted. The flat parts 80 on the flange 76 are used as antirotational devices in the installation of the control tube 40' on the rotor blade 1'. Each bush 74 comprises a shaft 82, wherein the lengths of said shafts 82 are matched to each other so that the bushes 74 clamp the tension-torque-transmission element 3' between themselves precisely in the centre. The tension-torque-transmission element 3' is thus positioned precisely on a longitudinal axis of the rotor wing, on which axis the centre of gravity of said rotor wing is also situated. The tension-torque-transmission element 3' centred in this manner is thus situated exactly in the line of influence of the centrifugal forces from the rotor blade 1, which centrifugal forces occur during operation, and in its centred position is not subjected to any moment loads resulting from eccentricity.

Since the rotor wings that have been described in detail above are only exemplary embodiments, said exemplary embodiments can in the usual way be modified to a large extent by the average person skilled in the art without leaving the scope of the invention. In particular, the specific cutting of the fiber layers and the order of their arrangement can also take place in a form that differs from that described in this document. Likewise, the mechanical coupling on the coupling section, or the control tube, can be designed in some other form if this is necessary for reasons of space or for design reasons. Furthermore, the use of the indefinite article "a" or "one" does not preclude the possibility of the respective characteristics being present in plural numbers.

LIST OF REFERENCE CHARACTERS

1 Rotor blade
3 Tension-torque-transmission element
5 Blade section
7 Blade transition section
9 Torque-transmission section
11 Connecting section on the blade side
13 Torque-transmission element
15 Connecting section on the hub side
17 Connecting eye
21 Lamellae
23 Slots
25 Front
27 Trailing edge
40 Control tube
41 Base body
42 Bearing arrangement section on the blade side
43 Lateral surface
44 Bearing arrangement section on the hub side
46 Control lever
47 Base
48 Edges
49 Head part
50 Threading opening
51 Cone end
52 Opening
54 Transition section
56 Tie section with internal cone
58 Internal cylinder
60 Drainage hole
62 Mounting wedge
68 Receiving pocket
70 Bolt
72 Counter nut
74 Bush
76 Flange
78 Connecting hole
80 Flat part
82 Shaft

The invention claimed is:

1. A rotor blade system for a rotary wing aircraft, the system including a rotor blade having a fiber-reinforced composite, the rotor blade also having
a blade section;
a coupling section for attaching the rotor blade to a hub of a drive device,
a sleeve-shaped control tube extending from the drive device, the control tube defining a hollow cylindrical shaft and a tubular tie section to tie the control tube to the rotor blade by sliding the control tube onto the coupling section of the rotor blade,
wherein the coupling section of the rotor blade and the tie section of the control tube include a cross-sectional shape for positive-locking interconnection of the rotor blade and the control tube and the coupling section of the rotor blade and the tie section of the control tube are conical in a longitudinal direction of the rotor blade.

2. The system according to claim 1, wherein there is provided a corresponding cross-sectional shape of the coupling section of the rotor blade on the one hand, and of the tie section of the control tube on the other hand.

3. The system according to claim 2, wherein the cross-sectional shape is ellipsoid.

4. The system according to claim 3, wherein there is provided a jacket-shaped contact surface on a circumference between the coupling section of the rotor blade and the tie section of the control tube.

5. The system according to claim 1, wherein the rotor blade and the control tube are bonded together on the coupling section or on the tie section.

6. The system according to claim 1, wherein the fiber-reinforced composite includes fiber layers from the blade section of the rotor blade integrated in the coupling section.

7. The system according to claim 6, wherein stiff, generally unidirectional, fiber layers are scarf-joined in the coupling section.

8. The system according to claim 1, wherein there is provided a transition section of the tie section on the blade side that continuously increases the stiffness of the control tube.

9. The system according to claim 8, wherein the rotor wing includes a torque-transmission section that forms an angle of incidence of the rotor blade and is arranged in the coupling section of the rotor blade.

10. The system according to claim 9, wherein there is provided a one-piece design of the rotor blade and the tension-torque-transmission element.

11. The system according to claim 1, wherein the coupling section of the rotor blade and the tie section of the control tube conically increase in size in longitudinal direction towards the rotor blade.

12. A rotor blade system for a rotary wing aircraft comprising:
a rotor blade having an airfoil, a coupling member configured to couple to a rotor hub, and a conical connection region connecting the airfoil and the coupling member; and
a sleeve-shaped control tube configured to couple with a rotor drive system, the control tube defining a passage having first and second portions, the second portion having a conical profile and being configured to frictionally engage the connection region when the rotor blade is inserted into the passage.

13. The rotor blade system of claim 12, wherein the connection region of the rotor blade has a perimeter and the connection region and second portion of the control tube frictionally engage along the entire perimeter.

14. The rotor blade system of claim 12, wherein the connection region of the rotor blade and second portion of the control tube conically increase in size in longitudinal direction toward the airfoil.

15. The rotor blade system of claim 12, wherein the coupling member, connection region, and airfoil are integrally formed.

16. The rotor blade system of claim 12, wherein the connection region of the rotor blade has an elliptical cross sectional shape and the second portion of the control tube has a corresponding elliptical cross sectional shape.

* * * * *